Feb. 4, 1930.  W. W. FOSTER  1,745,988
AUTOMATIC CATHEAD JERK LINE CONTROL
Filed Feb. 4, 1929  2 Sheets-Sheet 1
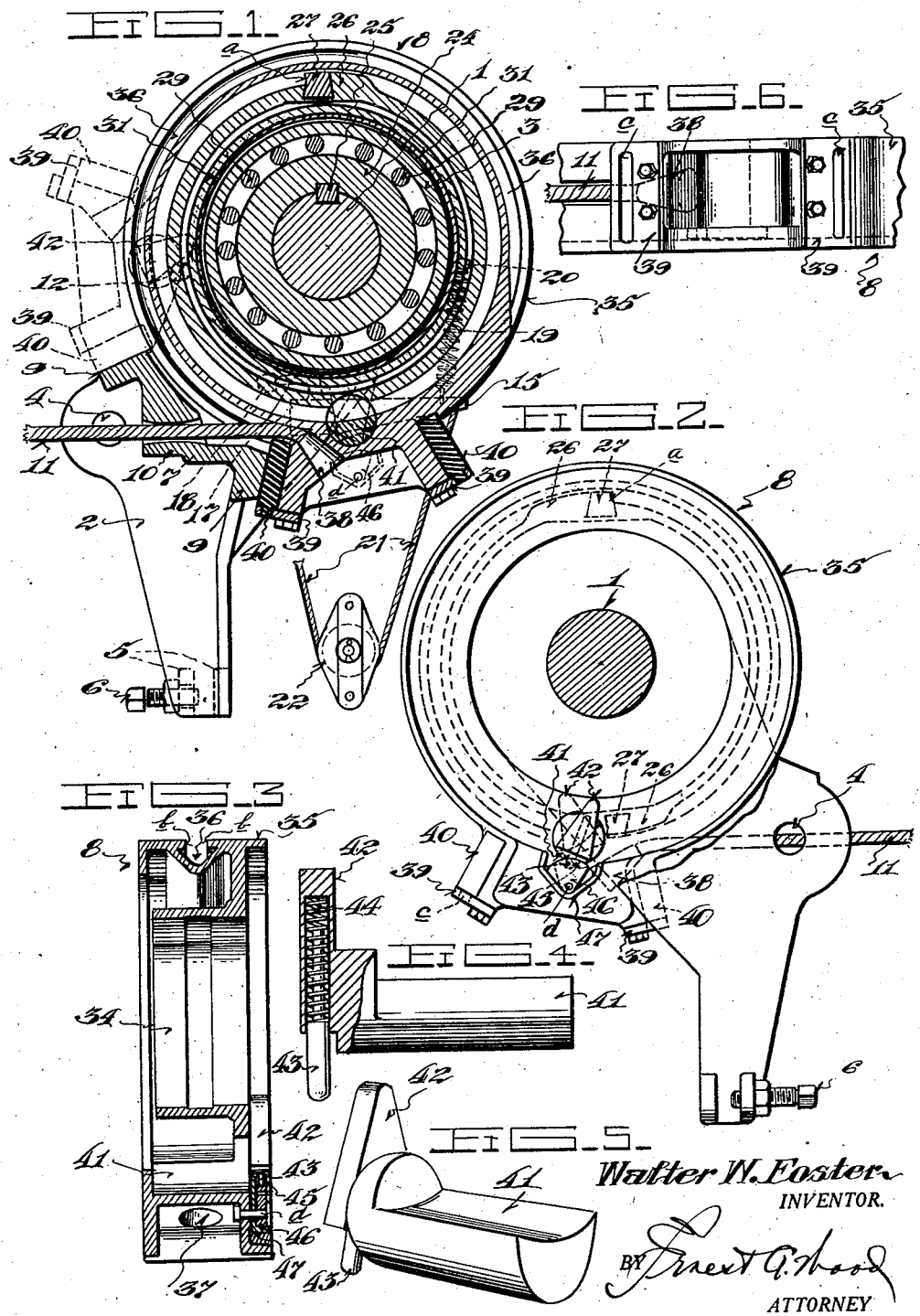
Walter W. Foster
INVENTOR.
BY Ernest G. Wood
ATTORNEY Feb. 4, 1930.          W. W. FOSTER          1,745,988
           AUTOMATIC CATHEAD JERK LINE CONTROL
                  Filed Feb. 4, 1929      2 Sheets-Sheet 2
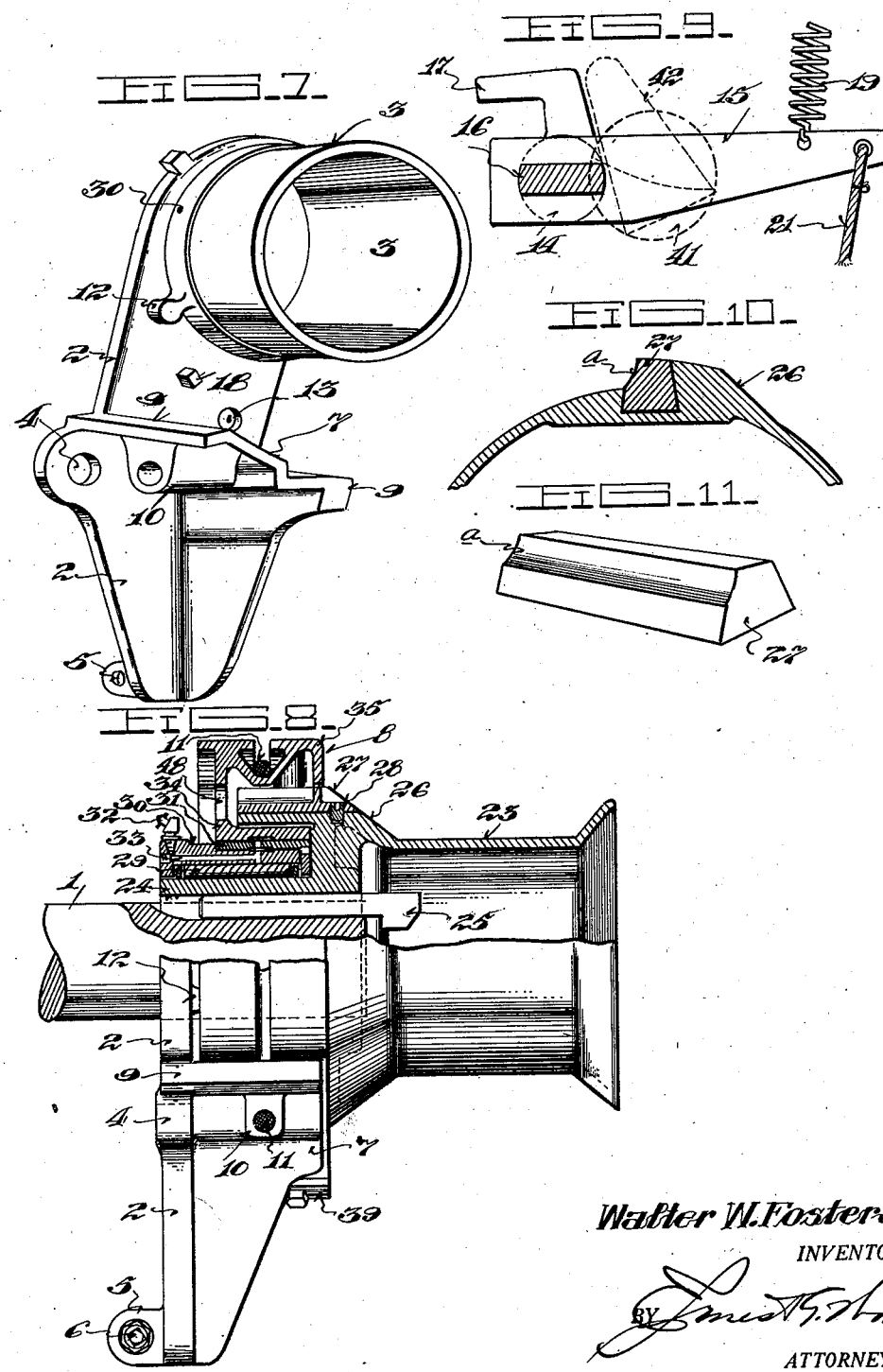
Walter W. Foster
INVENTOR.
ATTORNEYS.

Patented Feb. 4, 1930

1,745,988

UNITED STATES PATENT OFFICE

WALTER W. FOSTER, OF WICHITA FALLS, TEXAS

AUTOMATIC CATHEAD JERK-LINE CONTROL

Application filed February 4, 1929. Serial No. 337,318.

This invention relates to automatic jerk line controls and it has particular reference to what is generally known to the art as an automatic cathead, especially adapted for use in oil field work and the principal object of the invention resides in the provision of an apparatus of the character described deriving its power of operation from the line shaft of the draw works in a rotary well drilling rig and designed to exert upon a line connected to the pipe tongs, a series of successive pulls, with a force sufficient to secure the joints in setting up casing, tubing and the like.

Another object of the invention resides in the provision, in an apparatus as specified, of an improved clutch assembly comprised of parts which are capable of replacement when becoming impaired from excessive wear and for other reasons, the said clutch being of an extremely simple and durable nature and dependent entirely upon the will of the operator for its actuation, thus insuring against untimely operation, which is likely to result in injury to the operator, or possibly impairment to some part of the invention.

Still further, the invention comprehends among its objects, the provision of means for absorbing the excessive shock occasioned by the return action of the jerk line drum after completing each cycle of operation, which fact is not only annoying to the operators, but wears upon the parts to such extent as to eventually reduce the efficiency of the machine and shorten its period of usefulness.

In the drawings:

Figure 1 is a sectional view of the invention, showing the concentrical arrangement of parts and their relationship on the shaft.

Figure 2 is an end view, with portions of the bracket removed to illustrate the clutch action.

Figure 3 is a sectional view of the cat-head break out drum.

Figure 4 is a side elevational view of one of the clutch elements with portions broken away to illustrate the clutch trigger pin and spring.

Figure 5 is a perspective view of the clutch element.

Figure 6 is an underside view of the break- out drum in the position shown in Figure 1.

Figure 7 is a perspective view of the supporting bracket.

Figure 8 is a side elevational view of the invention operatively assembled, with portions broken away to illustrate the relationship of the various rotating elements.

Figure 9 is a detail view of the clutch engaging lever and spring.

Figure 10 is a fragmentary detail view of the cat-head shoulder key, forming part of the clutch assembly, and Figure 11 is a perspective view of the cathead shoulder key.

Before the advent of the automatic jerk line controls, generally known to the art as automatic cat-heads, for use in the drilling of wells, breaking of casing joints in dismantling, the steering was accomplished manually and in some cases, required the combined efforts of several men, due to the tightening of the joint by the rotary action of the assembly, rust in the thread, and for other reasons. Later, breaking out was accomplished by securing a manila rope to the end of the tongs, placing two or three turns of the rope upon the spool or cat-head mounted on the line shaft and then exerting a pull on the free end of the line, the friction upon the line over the surface of the cat-head being sufficient to pull the tongs and thus loosen the joint, and by continuing this operation, the tongs were oscillated the required number of times to break the joint. This method, while effective in a degree is likewise dangerous, since the line is likely to become entwined about the cat-head, which is constantly revolving, and sometimes entangled the operator before the power could be shut off.

The draw works line shaft is designated at 1 and is supported on the jack post of the draw works (not shown).

The supporting bracket of the apparatus, illustrated separately in Figure 7 is comprised of a plate 2 having cast integrally therewith a projecting bushing 3, and being further provided with an aperture 4 to enable the bracket to be secured to a wooden jack post by means of a bolt, but in case it is desired to affix the bracket to a steel post, a pair of ears 5 are provided near the bottom of the plate 2, having a set screw 6 threaded therein. It is understood that the securing means described are so positioned as to allow the line shaft 1 to pass through the bushing 3 when the device is operatively applied.

The bracket is further provided with a projecting plate 7 which, as apparent in Figure 1, follows the peripheral contour of the break out drum 8, to be later referred to, a short distance and has on either side thereof abutments 9, the purpose of which will be later made clear. It will be noted also in Figure 7 that the upper of these abutments has thereunder an apertured boss 10 through which passes the jerk line 11, which likewise will be mentioned later in the course of the description.

It is understood that the bracket described in the foregoing is a complete casting in which the elements mentioned are integral parts, and at the base of the bushing 3 is arranged a projection 12 which is a part of the clutch actuating means to be later described. An aperture 13 in the bracket plate 2 receives the disc 14 (see Figure 9) which has secured thereto, the clutch actuating lever 15. It will be observed in this figure that the disc 14 has a portion 16 which corresponds with and extends through a slot in the end of lever 15, and the disc has as an integral part thereof, an L shaped element 17, which co-operates with a projection 18 protruding from the surface of the plate 2, to constrain the lever 15 from moving upward beyond a predetermined point by the action of the spring 19 affixed to the outer end of the lever 15, and to a projection 20 extending from the side of the plate 2, as in Figure 1. To operate the lever 15, to in turn operate the clutch elements, a line 21 is secured to the end of the lever, and passes under a small pulley 22, as in Figure 1, to a point accessible to the operator.

The cat-head 23, shown with portions broken away in Figure 8, has as an integral part thereof a bushing 24, which is fixed to the protruding end of the shaft 1 by key 25. The bushing 24 is so cast as to define a portion 26, shown likewise in Figure 8, also in detail in Figure 10, which portion is grooved to receive a key 27, the latter being held in place by set screw 28 as in Figure 8, and is provided with a striking surface $a$, which is adapted, in operation to engage the clutch element shown in the several figures, and in detail in Figures 4 and 5. A separate reference will be applied to this element later in the description.

Mounted to encircle the cat-head bushing 24 is a roller bearing assembly 29, which latter receives the bushing 3 of the supporting bracket in concentric relationship. It will be noted in Figure 7 that the bushing 3 of the supporting bracket has an annular raised portion 30 near the point where it joins the plate 2. Intermediate this portion 30 and the outer end of the bushing is mounted a bronze bushing 31.

As a means of lubricating the bushing and associated parts, a grease pump connection 32 is provided on and near the top of the supporting bracket, as may be seen in Figure 8 exclusively, and which connection has communicating therewith a passage 33, which latter reaches to the approximate center of the support bushing 3, from which lateral branches extend outward into the bearing race and bushing 31. It may be noted that the bushing has an annular groove about its external periphery to contain and distribute the lubricating medium about the parts.

Referring now to the outer element, hereinbefore briefly referred to as the cat-head break-out drum 8, this element is shown in axial cross section in Figure 3 and is comprised of an inner bushing or bearing 34, receivable upon the bronze bushing 31 and has cast integral therewith the external rim 35, which latter is provided with a peripheral groove 36 to receive and hold the cable or jerk line 11 in proper operating position. It is apparent in Figure 3 that this groove is substantially V-shaped and has overhanging edges $b$ to constrain the jerk line 11 against buckling and becoming thus displaced from its proper position around the surface of the drum.

The portion 26 of the cat-head 23, as apparent in Figure 1 is receivable between the outer periphery of the break-out drum bearing 34 and the outer rim 35 and the drum 8 is capable normally of free rotation irrespective of rotation of the cat-head, which, as has been stated previously, is normally in motion.

With further reference to the break-out drum 8, this element has as an integral part thereof a protruding segment in the form of a hopper-like structure, having a conical opening 37, (see Figure 3), which receives the end fitting 38 upon the jerk line 11, as apparent in Figure 1. It is apparent in this figure that the peripheral groove 36 in which the jerk line reposes is discontinued at the point where the segment is formed in order that the drum 8 may be strengthened at this point, and in view of the fact that the jerk line is only wound approximately three fourths the circumference of the drum.

As apparent in Figure 6, a plate 39, having a slot $c$ longitudinally thereof is affixed by screws to either side of the segment referred to; the slots $c$ receiving reduced ends of rubber bumpers 40, the latter reposing within recesses provided therefor on either side of the segment and are held secure by the fixed plate 39. These bumpers 40, as apparent in Figure 1, alternately strike the stops 9, previously referred to as forming part of the supporting bracket, as the break-out drum 8 is rotated to and fro in pulling the line 11, thus relieving or cushioning the shock which would otherwise result from metal to metal contact, and eventually impair the effectiveness of the machine.

Referring now especially to the clutch assembly, including the element 41 shown in Figures 4 and 5, it will be noted in Figures 1 and 2 that this element is of semi-cylindrical form. It will also be noted that the semi-cylindrical portion of this element has one side which is slightly concaved to conform with the circular path traveled by the portion 26 of the cat-head 23, shown in Figures 1 and 10 particularly, or rather the key 27 carried by this portion.

It is apparent in Figure 1 that an annular space is provided between the cat-head bushing 24 and the break out drum 8, and in which space the bushing 24 freely rotates with the line shaft 1, carrying with it the key 27, which latter is provided with a surface $a$ corresponding with the cylindrical form of the clutch element 41. The element 41 is moved so as to cause that portion heretofore referred to as semi-cylindrical, to project into the circular portion of the key 27, whereupon the latter, it being understood that the shaft and cat-head are constantly rotating, will carry the drum 8 to the position shown in dotted lines in Figure 1, thereby imparting a pull upon the line 11, since the end of the latter is fixed to the drum as described.

Upon reaching the extreme position shown in dotted lines in Figure 1, the tongue portion 42 of the clutch element comes into contact with the projection 12, integral with the bracket casting and mentioned previously, thereby causing the cylindrical portion 41 to return to its original position shown in Figure 1, allowing the key 27 free rotative passage without affecting the drum 8, since the concave portion of the cylindrical part of the clutch element is alined with the path traveled by the key 27 as previously explained.

It is understood that reciprocative action of the line is always at the will of the operator. The detail shown in Figure 9 comprises the elements by which the clutch element 41 is caused to move to effect engagement of the rotating elements with the break-out drum 8 as explained. These details are comprised of the lever 15, hereinbefore mentioned, pivotally operating in the aperture 13 of the bracket casting having an extended portion 17, against which the tongue portion 42 of the clutch element normally rests when the drum 8 is intended to remain motionless. A slight pull upon the line 21 will cause the lever 15 to move to urge the portion 17 against the tongue 42 of the clutch element, causing the latter to rotate to operative position, or to a position to be intercepted by the key 27 in its passage. The drum 8 is thus carried to the opposite position to allow contact of the tongue portion of the clutch element with the protuberance 12 of the bracket casting for release of the members, as explained. Any suitable means (not shown) may be employed for returning the drum 8 each time to operative position. The spring 19, previously mentioned is for the purpose of returning the operating lever 15 to proper position for again operating the clutch element 41 in the manner described.

In order to maintain position of the clutch element 41 as it is rocked to and fro in locking and releasing the parts, a torsion means such as shown in Figures 2 to 4 inclusive, is provided which consists of a pin 43, yieldingly constrained by spring 44, as in Figure 4, to normally engage within a recess 45, in a fan shaped member 46 pivoted at $d$ within a frame 47 welded or otherwise suitably affixed to the side of the hopper-like protuberance on the periphery of drum 8. The example shown in dotted and full lines in Figure 2 very clearly depicts the action of the pin 43 and fan shaped member 46 in controlling the movements of the clutch element 41. When the lever 15 is pulled down by the operator, the urge of the portion 17 thereof against the tongue 42 of the clutch element will move the latter and as its movement continues, the urge of the spring 44 against the pin 43 becomes greater, thereby holding the clutch torsionally in one position, at the same time rocking member 46 on its pivot $d$. As the tongue 42 of the clutch engages the protuberance 12 to return it to inoperative position, the action upon the torsion elements is precisely the same but in a reverse manner, the sides of the frame 47 containing the fan-like member limiting the movements of the latter and also the clutch.

Of particular importance among the novel features of the invention is the fact that the key 27 is capable of removal or replacement when becoming impaired through constant usage. This member receives a great amount of wear as the impact thereof against the clutch 41 carries considerable force, and to effect its removal without interference by any adjacent parts of the structure, an opening 48 is made in the break-out drum 8, and may be seen near the top of the drum in Figure 8 alined with the rear end of the key. It is likewise apparent that by simply removing the pivot $d$ of the fan-like clutch controlling member, this, as well as the clutch itself may be removed for repair or replacement when becoming worn to such extent as to impair the effectiveness of the machine.

Under normal conditions, the free end of line 11 is attached to the handle of the conventional casing tongs (not shown) and a pull upon the operating line 21 will actuate the lever 15 to cause the clutch to move to a position to be intercepted by the key 27, thus carrying the drum 8 around and imparting a pull upon the jerk line 11, and upon reaching the extremity, the clutch is again actuated by its engagement with protuberance 12 to return it to inoperative position, the drum 8 then returning to normal operative position preparatory to another operation without influence by the cat-head 23, which rotates constantly in one direction at all times.

Manifestly the construction shown and described herein may be modified from time to time as may be considered practicable without departing from the spirit or intent of the invention as expressed in the appended claims.

What I claim is:

1. An automatic cat-head including a normally rotating member and a drum normally capable of free rotative movement on said rotating member and having an annular peripheral channel; a jerk line having one end fixed at a predetermined point in said channel whereby to constrain the line to lie within said channel, a rotatable clutch key carried by said drum, a removable abutment on said normally rotating member to engage said clutch key to lock the said drum and member for simultaneous rotation, and means to render said locking means inoperative to release said drum when the latter has been rotated a predetermined extent.

2. An automatic cat-head including a normally rotating member and a freely mounted drum having a channeled periphery to receive a line fixed to said drum, bracket means for supporting said drum for free rotative movement, means carried jointly by said normally rotating member and said drum to cause the latter to be rotated a predetermined extent, means to release said latter means and means carried by said bracket and drum to absorb the shock at the reversing points of said drum.

3. An automatic cat-head including a normally rotating member and a rotatable drum carrying a jerk line, means to alternately effect connection and disconnection between said member and drum at each extreme position to which said drum is rotated, bracket means supporting said drum independently of said rotating member and means carried jointly by said drum and rotating member to yieldingly arrest the motion of said drum at each extreme position to which it is rotated.

4. An automatic cat-head including a member normally rotating in one direction, a rotatable drum carrying a jerk line, means for effecting alternate connection and disconnection of said member and drum, and means carried jointly by said drum and supporting means to yieldingly arrest motion of said drum at each operation of said connecting means.

5. An automatic cat-head including a member normally rotating in one direction and a rotatable drum carrying a jerk line, means to support the drum, means for effecting alternate engagement and disengagement of said member and drum, means to tension the movement of said latter means, means carried by said drum and its supporting means for arresting the rotative motion of said drum, and means for cushioning the shock of arrestation.

6. An apparatus of the character described including a rotating element and a rotatable drum having a channeled periphery to retain a line, means for locking said element and drum to cause the latter to rotate in one direction and means to disconnect said element and drum after the latter has rotated a predetermined extent to allow the same to return to operaive position and means to tension said latter means.

7. An automatic cat-head including a normally rotating member, means to support the member, a drum mounted on the supporting means for rotation independent of the member, a jerk line connected to the drum, means to lock the drum to the member, means to release the drum from the member at a predetermined point in the rotation of the drum, a pair of spaced radial stops on the drum, a pair of spaced stops on the supporting means and shock absorbing means carried by the stops of one pair to engage the respective stops of the other pair.

In testimony whereof I affix my signature.

WALTER W. FOSTER.